UNITED STATES PATENT OFFICE 2,565,003

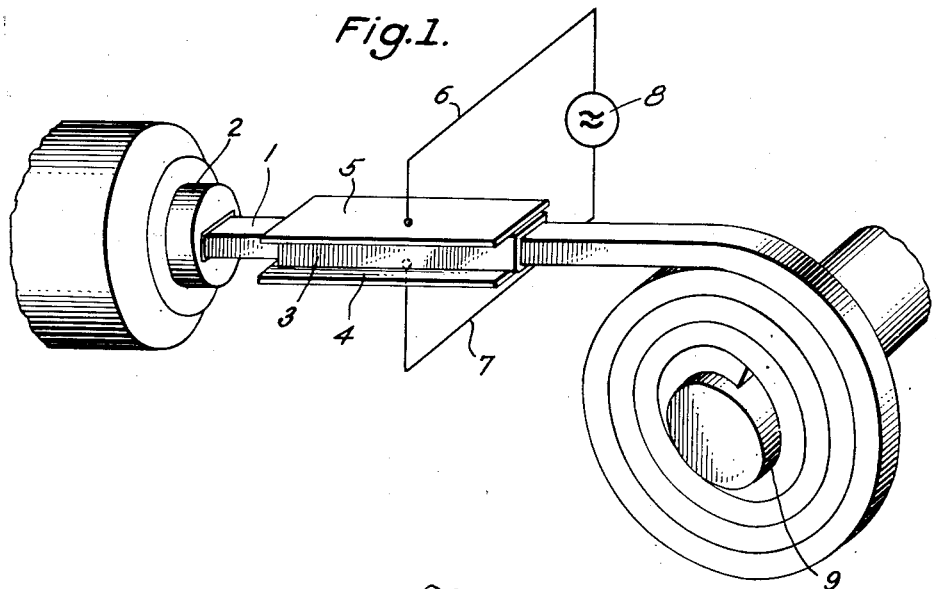
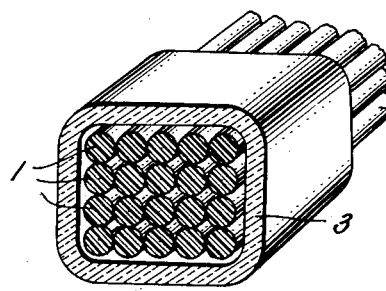
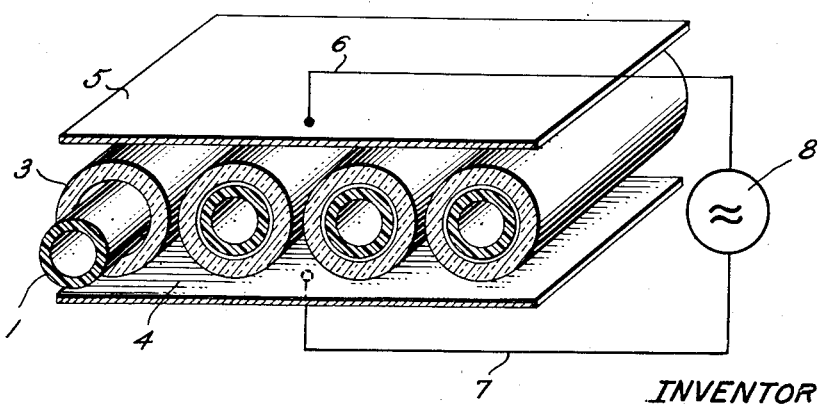

APPARATUS FOR THE VULCANIZATION OF PLASTIC MATERIALS

Josef Šimorda, Zlin, Czechoslovakia, assignor to Bata, Narodni Podnik, Zlin, Czechoslovakia Application March 5, 1948, Serial No. 13,216
In Czechoslovakia March 17, 1947

6 Claims. (Cl. 18—6)

The present invention relates to the heat treatment of plastic materials by means of a high frequency electric field, more particularly to the vulcanisation of rubber articles of indefinite length, such as are obtained, for instance, at the outlet from an extrusion press.

The high frequency electric field used heats the plastic material throughout the cross-section area of the same so that the temperature of the material increases very rapidly. Since the plastic material leaves the extrusion press already in heated condition and passes directly into the electric field, it is easily conceivable that the duration of such a vulcanisation process represents a fraction only of the period which is required for the usual vulcanisation in kettles. Another advantage of the frequency vulcanisation consists in the possibility of effecting the vulcanisation continuously and, as a consequence, in the possibility of treating articles or products of indefinite length.

Accordingly, apparatus for the continuous vulcanisation of rods, cords, strings, threads, etc., of plastic materials have been devised, in which the products to be treated have been subjected to the effect of the high frequency electric field of a condenser, the products being caused to travel between the electrodes of the condenser. Under the action of the electric field generated the articles are heated and thereby vulcanised. However, in such apparatus, it has been found that the highest temperature prevails always in the center of the cross-section of the article under treatment while the temperature decreases towards the surface of the article. Since a uniform temperature throughout the cross-section of the article to be vulcanised represents a very important working condition and influences the quality of the vulcanised article, attempts have been made to eliminate this disadvantage by adapting the shape of the condenser electrodes to the shape of the articles to be vulcanised. However, this provision is ineffective since it has been found that the temperature differences in the article are the result of heat radiation to the surroundings and, as a consequence, also to the condenser electrodes. In fact the electrodes of the condenser are not heated by the action of the high frequency currents. Neither the additional heating of the electrodes with steam has produced satisfactory effects, apart from the fact that the use of such very different heat supply agents, as steam and electricity, leads to complications in the construction of the vulcanising apparatus.

The foregoing explanations show that in the case of continuous vulcanisation of articles or products of any desired length in a high frequency electric field it is necessary to insulate thermally the articles under treatment.

The present invention consists in an apparatus for the vulcanising of products or articles of any desired length in a high frequency electric field, wherein during the vulcanising process the articles are caused to travel through a sleeve made of a material which has the same dielectric characteristics as the plastic material to be vulcanised, the electric field being common to the sleeve and the plastic material and the sleeve acting as thermal insulation to protect the article heated to vulcanisation temperature against loss of heat, such protection resulting from the heating, by the electric field, of both the plastic material to be vulcanised and the thermally insulating sleeve in such a way that the internal wall of the sleeve and the article under treatment are at the same temperature whereby the temperature in the whole cross-section of the treated portion of the article is equally distributed.

Therefore, it is important to use for the thermal insulation a material which as far as possible has the same dielectric characteristic as the plastic material to be vulcanised. It is broadly known that the amount of heat which is developed under the action of an alternating electric field in materials of low conductivity, such as rubber and artificial resins, is directly proportional to the product of the dielectric constant and the phase shift, which is produced by the watt current component in the condenser. The said non-conductive materials may be constituted also by mixtures of different materials such as, for instance, by mixtures of artificial resins with various mineral substances, of with ground textile material or wood. By suitable additions it is possible to influence the two aforementioned factors and to adapt in this way the dielectric characteristics of the thermal insulation to the dielectric characteristics of the plastic material under treatment.

The wall thickness of the thermally insulating sleeve is determined in such a way that the temperature gradient between the inner and outer surfaces of the sleeve allows for such heat radiation to the surroundings as to keep the inner wall of the sleeve at the temperature of the vulcanised plastic material. Under these conditions the vulcanised plastic material cannot radiate heat to the surroundings, that is to say: into the thermally insulating sleeve, since no temperature gradient exists between the sleeve (the inner surface of the same) and the plastic material. Heat is radiated from the surface of the sleeve only, the radiation taking place in such a manner that the amount of radiated heat is equivalent to the amount of heat developed in the body of the sleeve under the action of the high frequency field, and that the temperature at the inner surface of the sleeve is the same as that of the vulcanised plastic material.

In the case of the manufacture of threads, strings and similar products of plastic materials, a bundle of such products may be caused to travel through the sleeve during the vulcanisation process. This provision permits to increase the output, and a similar effect may be obtained by arranging a number of parallel sleeves in juxtaposed relationship. In the case of the vulcanisation of hose or of products having a complicated shape in cross-section, such as packing of various kinds, the sleeve must have a cross-sectional shape corresponding to that of the product to be vulcanised so as to prevent the latter from being distorted.

The accompanying drawing shows diagrammatically an example of carrying out the invention. The same reference numerals are used to denote the corresponding elements throughout the figures of the drawing.

Fig. 1 shows the general lay-out of the vulcanising apparatus;

Fig. 2 shows in cross-sectional view the sleeve containing a bundle of articles; and Fig. 3 shows a parallel arrangement of the sleeves between the condenser electrodes.

The product 1 to be vulcanized is delivered from an extrusion press 2, as shown in Fig. 1, and passes through a thermally insulating sleeve 3, located between the electrodes 4 and 5 of a condenser, which by means of conductors 6 and 7 is connected to a source 8 of high frequency current. The vulcanised product is wound on a drum 9.

When cords, strings, threads and like products are to be vulcanised, a bundle 1 of such products is caused to travel through a thermally insulating sleeve 3, as is shown in Fig. 2.

A parallel arrangement of sleeves 3, as shown in Fig. 3, between the electrodes 4, 5 of the condenser, in the case of the vulcanisation of hose, increases the output of the apparatus. The electrodes 4 and 5 are fed with high frequency current from a source 8 by means of supply conductors 6, 7.

What I claim is:

1. In an apparatus for the continuous heating or vulcanising, in a high frequency electric field, of an article having indefinite length and made of plastic materials, the combination with a thermally insulating sleeve of a condenser supplied with high frequency electric current, the sleeve being arranged between the two electrodes of the condenser and means for advancing the article through said sleeve.

2. In an apparatus for the continuous heating or vulcanising a high frequency electric field, of articles having an indefinite length and made of plastic materials, the provision of a number of thermally insulating sleeves arranged side by side in parallel relationship, a condenser supplied with high frequency electric current and having two electrodes with the sleeves disposed between the latter and means for advancing the articles through said sleeves.

3. Apparatus as defined in claim 1 in which the thermally insulating sleeve has dielectric characteristics similar to those of the plastic material.

4. Apparatus as defined in claim 1 in which the cross-sectional shape of the sleeve is similar to the cross-sectional shape of the plastic material.

5. Apparatus as defined in claim 1 in which the article to be vulcanized is in the form of a bundle and the cross-sectional shape of the sleeve is similar to that of the bundle.

6. Apparatus as defined in claim 1 in which the thickness of the wall of the sleeve is sufficient to maintain its inner surface temperature substantially equal to the outer surface temperature of the plastic material.

JOSEF ŠIMORDA.

REFERENCES CITED

The following references are of record in the file of this patent:

UNITED STATES PATENTS

| Number | Name | Date |
| --- | --- | --- |
| 2,280,771 | Dufour et al. | Apr. 28, 1942 |
| 2,288,269 | Crandell | June 30, 1942 |
| 2,421,097 | Lakso | May 27, 1947 |
| 2,441,548 | Sperry | May 11, 1948 |
| 2,463,288 | Leguillon | Mar. 1, 1949 |